T. KIHLGREN.
GRINDING DISK.
APPLICATION FILED AUG. 17, 1910.
992,000.
Patented May 9, 1911.
2 SHEETS—SHEET 1.
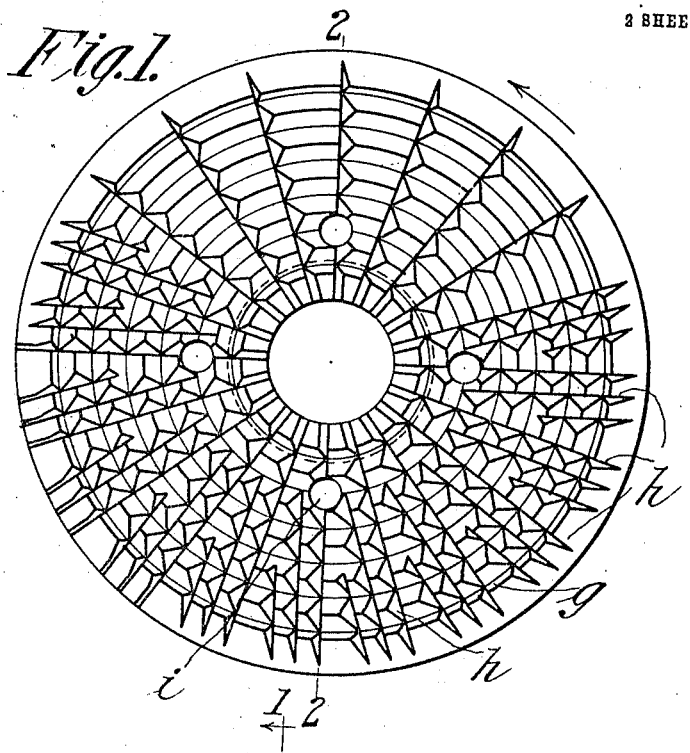
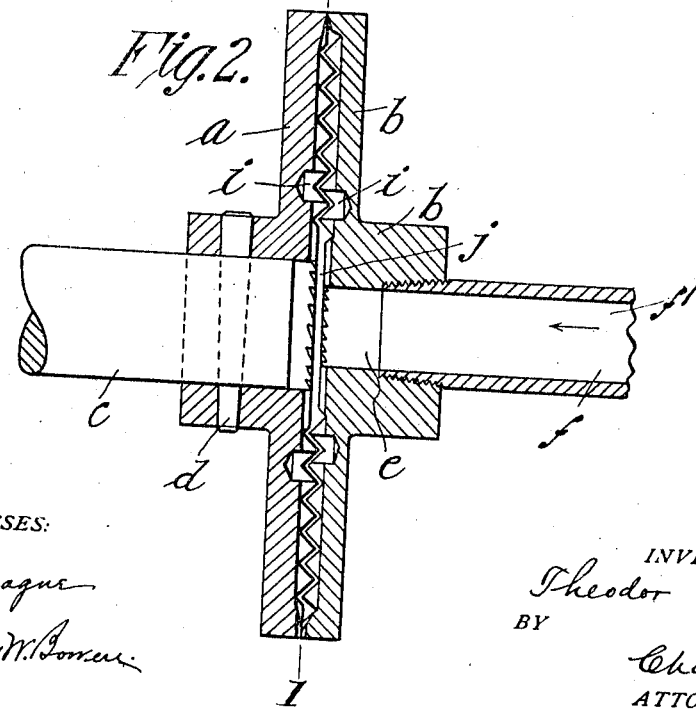
WITNESSES:
H. L. Sprague
Harry W. Bowen
INVENTOR.
Theodor Kihlgren
BY
Chapin & Co.
ATTORNEY.

T. KIHLGREN.
GRINDING DISK.
APPLICATION FILED AUG. 17, 1910.

992,000.

Patented May 9, 1911.
2 SHEETS—SHEET 2.

WITNESSES:
H. L. Sprague
Harry W. Bowen

INVENTOR.
Theodor Kihlgren
BY Chapin Neal
ATTORNEY.

UNITED STATES PATENT OFFICE.

THEODOR KIHLGREN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

GRINDING-DISK.

992,000.  Specification of Letters Patent.  Patented May 9, 1911.

Application filed August 17, 1910. Serial No. 577,674.

*To all whom it may concern:*

Be it known that I, THEODOR KIHLGREN, a citizen of the United States of America, residing at Springfield, in the county of Hampden and State of Massachusetts, have invented new and useful Improvements in Grinding-Disks, of which the following is a specification.

This invention relates to improvements in grinding mills and is particularly designed for grinding chocolate which consists of the ground cocoa bean and sugar mixed together, the grinding being effected when the mixture is in a heated condition. Previous attempts have been made to reduce or grind chocolate to the desired fineness by means of rolling, but such mechanisms are found to be slow in their operation and inefficient.

Broadly, my invention consists in providing two disks or plates, their contiguous faces having thereon concentrically arranged rows of teeth that are angular in cross section,—one of the disks may be fixed or both may be movable, as desired. The advancing edges of the teeth are chamfered so that when their apices approach each other the material will be caught between the chamfered edges and subjected to a grating or squeezing action, the material to be ground being introduced between the disks at their centers, and the ground material escaping around the peripheries of the same.

A further object of the invention is to provide means for catching or retaining any particles of metal, grit, or other foreign substance of a hard nature that may be carried into the grinding space, and this means consists of pockets that are suitably located with reference to the point of entrance of the material, whereby the plates are prevented from injury and the particles are removed and prevented from being retained in the finished product or ground chocolate.

Figure 3:
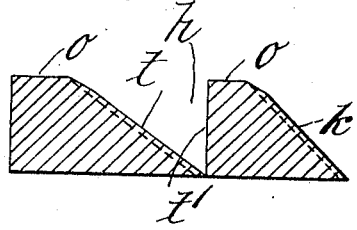
Figure 4:
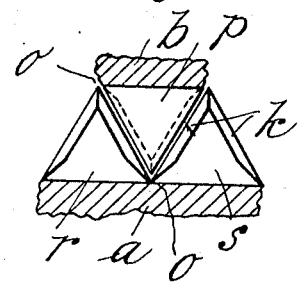
Figure 5:
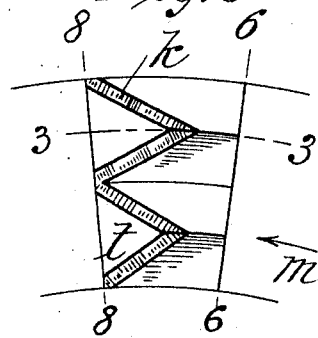
Figure 6:
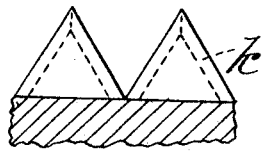
Figure 7:
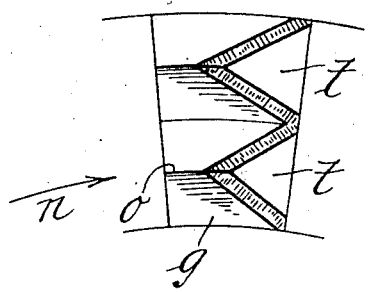
Figure 8:
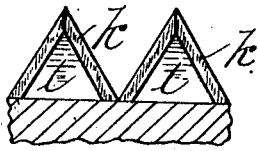

In the drawings forming part of this application,—Figure 1 shows an inside face view of one of the grinding disks which is the same in construction as its companion. Fig. 2 is a transverse sectional view through the disks, the section being taken on the axis of the shaft. Fig. 3 is an enlarged view on the line 3—3 of Fig. 5 showing two of the teeth in section and indicating in dotted lines the chamfered edges. Fig. 4 is an enlarged detail view showing the relative position of the grinding teeth when in use and indicating that the chamfered edges of the teeth are oppositely disposed or slant in the opposite directions. Fig. 5 is an enlarged top plan view of two concentrically arranged teeth of one of the disks and clearly indicating the chamfered surfaces on each tooth, the teeth being shown as pointing toward the right. Fig. 6 is a view of Fig. 5 looking in the direction of the line 6—6 from the right-hand side. Fig. 7 is a view similar to Fig. 5 showing the teeth pointed in the opposite direction, and Fig. 8 is a view on the line 8—8, Fig. 5, looking from the left.

Referring to the drawings, $a$ indicates one of the grinding disks, and $b$ the other. The disk $a$ is preferably a rotatable one, being connected to the shaft $c$ by means of the pin $d$. The disk $b$ is provided with an inlet opening $e$ having a threaded pipe $f$ for introducing the material to be ground, as indicated by the arrow $f^1$.

Referring to Fig. 1 (which shows a general view of the toothed face of one of the disks) it will be noticed that the same is provided with a series of concentrically arranged teeth or V-shaped ridges or projections $g$ which are cut transversely by means of the right-angular-shaped grooves $h$ that radiate from the center (Fig. 3). Between the teeth $g$ are V-shaped recesses for receiving the V-shaped teeth of the companion disk. Located near the center of the disks are openings or pockets $i$ which are for the purpose of catching or retaining any foreign substance that may be contained in the chocolate to be ground,—as small particles of iron or grit. Since these are located near the entrance pipe $f$ and near the grinding chamber $j$ they will receive and retain these foreign substances before the material is forced radially outward.

Referring now to the construction of the teeth shown in Figs. 3 to 8 which are enlarged detail views: It will be noticed that the inclined edge of each tooth is provided with chamfered surfaces $k$, plainly indicated in the plan views in Figs. 5 and 7, and in the end view of Fig. 8. The teeth $g$ are arranged on the two disks $a$ and $b$ so as to point in opposite directions, as indicated in Figs. 5 and 7, which are detailed views of two teeth taken from each of the disks, and the arrows $m$ and $n$ indicate the direction in which the disks rotate, or the rotative effect. The apex or top $o$ of each tooth $g$ faces or points toward the bottom of the groove of the other teeth, as indicated in Fig. 4, in which the tooth $p$ for instance is shown located between two teeth $r$ and $s$, and considering the teeth $r$ and $s$ to be fixed and the tooth $p$ to be movable in a direction at right angles to the plane of the paper and away from the observer, the chamfered surfaces $k$ will be caused to move toward each other with the result that the chocolate is subjected to a pinching or squeezing action, or possibly the particles that are being ground are subjected to a grating action one over the other, or in other words a sliding effect. The inclined portions $t$ of the teeth also act in the same manner as the chamfered surfaces $k$, but the greatest effect is produced by the surfaces $k$, since there is no cutting of the particles, but merely a pinching, as described.

I am aware that it is old to provide grinding disks with V-shaped teeth in cross section with the result that the particles that are being operated upon are merely cut or finely divided; but I am not aware that it is new to chamfer the edges of these teeth in order to produce the sliding or pinching effect on the substances that are being ground. The result of this action has been found not to heat the disks as in the cutting operations, and that they are much faster in reducing the product to the required fineness than where the chamfered edges are omitted.

It will be noticed that the right-angular shaped groove $h$ which radiates from the center forms the inclined surfaces $t$ of the teeth $g$, and the surface $t^1$ opposite to the surfaces $t$ is vertical or normal to the plane of the disk. These right angular-shaped grooves serve the purpose to permit the chocolate to move outwardly from the entrance pipe $f$ during the grinding operations as the teeth pass by each other, and during this radial movement of the chocolate some of the material is caught and subjected to a pinching effect between the chamfered surfaces, at which point substantially all of the grinding is effected.

What I claim is:—

1. In a grinding machine comprising a pair of disks, the opposite faces of which are serrated or dented in cross section, and the serrated faces radially divided by grooves, whereby teeth, V-shaped in cross-section are produced, the inclined or slanting edge of each tooth being chamfered, and means for rotating one or both of the disks.

2. A grinding disk provided with a series of concentrically arranged teeth, right-angular shaped grooves radiating from the center of the disk for providing grinding surfaces on each tooth, and each tooth having a chamfered edge, the center of the disk having an opening therethrough for introducing the material to be ground, and a second disk arranged in opposed relation to the first disk, as described.

3. In a machine for grinding chocolate comprising a pair of disks each provided with concentrically arranged rows of teeth interengaging each other and each tooth having an inclined portion, the teeth pointing in opposite directions and each tooth having a chamfered edge on its inclined portion for subjecting the material to a pinching effect.

4. A grinding disk having its operative face provided with teeth that are cut by angular-shaped grooves which produce an inclined surface on each tooth, each tooth having a chamfered edge adjacent the inclined surface, whereby when two such disks are assembled face to face, a pinching effect is imparted to the material being ground as it passes from the grinding space through the angular grooves.

5. In a grinding disk, a tooth inverted V-shaped in cross-section and having one end provided with a vertical or normal surface, and its opposite end with an inclined flat surface co-equal with the width of the tooth, and chamfered edges or surfaces between the sides of the inverted V-shaped part and the inclined flat-surface.

THEODOR KIHLGREN.

Witnesses:
K. I. CLEMONS,
HARRY W. BOWEN.